United States Patent
Sugai et al.

(10) Patent No.: US 7,958,868 B2
(45) Date of Patent: Jun. 14, 2011

(54) CONTROL DEVICE FOR VEHICLE

(75) Inventors: Shinichi Sugai, Toyota (JP); Koichiro Muta, Okazaki (JP); Yuichiro Kitamura, Anjo (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 358 days.

(21) Appl. No.: 12/160,372

(22) PCT Filed: Dec. 27, 2006

(86) PCT No.: PCT/IB2006/003767
§ 371 (c)(1),
(2), (4) Date: Jul. 9, 2008

(87) PCT Pub. No.: WO2007/080446
PCT Pub. Date: Jul. 19, 2007

(65) Prior Publication Data
US 2010/0228461 A1    Sep. 9, 2010

(30) Foreign Application Priority Data

Jan. 10, 2006   (JP) ................................. 2006-002564

(51) Int. Cl.
*F02P 5/00*   (2006.01)
(52) U.S. Cl. .............................. 123/406.11; 123/406.23
(58) Field of Classification Search ............. 123/406.11, 123/406.23–406.25
See application file for complete search history.

(56) References Cited

U.S. PATENT DOCUMENTS

| | | | | |
|---|---|---|---|---|
| 4,246,805 A | * | 1/1981 | Umezawa | 477/102 |
| 4,525,781 A | * | 6/1985 | Konomi et al. | 701/99 |
| 4,827,885 A | * | 5/1989 | Nishikawa et al. | 123/339.11 |
| 4,854,285 A | * | 8/1989 | Kanno et al. | 123/406.51 |
| 4,924,832 A | * | 5/1990 | Abe | 477/102 |
| 5,133,319 A | * | 7/1992 | Ikeda et al. | 123/339.11 |
| 5,909,720 A | | 6/1999 | Yamaoka et al. | |
| 6,393,349 B1 | * | 5/2002 | Yasuoka | 701/54 |
| 6,543,220 B2 | * | 4/2003 | Yoshida et al. | 60/285 |
| 2002/0179047 A1 | | 12/2002 | Hoang et al. | |
| 2003/0073540 A1 | | 4/2003 | Eguchi et al. | |

FOREIGN PATENT DOCUMENTS

| | | |
|---|---|---|
| JP | 2000-257453 A | 9/2000 |
| JP | 2002-332893 A | 11/2002 |
| JP | 2004-11650 A | 1/2004 |
| WO | 2007/052758 A1 | 5/2007 |

* cited by examiner

*Primary Examiner* — John T Kwon
(74) *Attorney, Agent, or Firm* — Sughrue Mion, PLLC

(57) ABSTRACT

A vehicle control device for a hybrid vehicle, which equipped with at least an internal combustion engine and a rotary electrical machine that reduces the shock that is imparted to a vehicle when the internal combustion engine starts. The vehicle control device detects the running state of the vehicle and, if it is determined that the internal combustion engine will be started, adjusts the ignition timing according to the running state of the vehicle. The control device also improves the responsiveness of the hybrid vehicle when increased acceleration is required.

12 Claims, 7 Drawing Sheets

CONTROL DEVICE FOR VEHICLE

BACKGROUND OF THE INVENTION

1. Field of the Invention

The present invention relates to a control device for a vehicle that employs at least two power sources, one of which may be an internal combustion engine and the other may be, for example, a rotary electrical machine. In particular, the invention relates to a control for reducing starting shock when the internal combustion engine starts.

2. Description of the Related Art

Many techniques have been developed for improving the startability of internal combustion engines. For example, Japanese Patent Application Publication 2002-332893 (JPA 2002-332893) describes an engine control device for a ship propulsion system that avoids increasing the air/fuel ratio when a warm engine is restarted due to fuel vapor being returned to the intake system, to improve startability of the engine. The described engine control device is applied to a ship propulsion system, which comprises a fuel control device that controls the amount of fuel supplied via a fuel supply path from an engine fuel supply device, provided in the ship propulsion system, and which returns fuel vapor generated in the fuel supply path back into the intake passage. The described engine control device comprises a warm engine restart determination means, which determines whether the engine should be started under a warm engine restart control, and a starting mode changeover means, which changes over from a normal starting mode to a warm engine restart mode, when the engine will be restarted under a warm engine restart control. Furthermore, this engine control device advances the ignition-timing angle directly after starting.

According to the engine control device described in JP A 2002-332893, the startability is enhanced by changing over from the normal starting mode to the warm engine restart mode based upon the decision of the warm engine restart state, and reducing the fuel supply amount while maintaining total of the fuel amount in the mixture gas at an appropriate amount, so that the air/fuel ratio does not increase. Furthermore, by advancing the ignition-timing angle, the engine is less likely to stall, thus enhancing the startability.

In a hybrid vehicle that employs at least two power sources, one of which may be an internal combustion engine and the other may be, for example, a rotary electrical machine, sometimes the internal combustion engine is started while the vehicle is moving. Thus, in order to enhance the acceleration responsiveness of the vehicle, when the internal combustion engine is started, the angle of the ignition timing of the internal combustion engine is advanced, which causes the torque to increase abruptly directly after starting. Because of this, an abrupt torque fluctuation is transmitted along the power transmission path, and there is a possibility that a shock upon the vehicle will be created. As a result, the drivability of the vehicle is made worse.

According the engine control device described in JP A 2002-332893, there are no measures provided to minimize the effect of shock on the vehicle due to abrupt torque fluctuation when the engine is started. Due to this, it is not possible to solve the problem described above.

SUMMARY OF THE INVENTION

The present invention has been conceived in order to solve the problem described above, and provides a control device for a vehicle, that reduces the shock that is created when an internal combustion engine starts.

The control device for a vehicle according to the first aspect of the invention is a control device for a vehicle that uses, as a source of drive power, at least two power sources, one of which may be an internal combustion engine and the other may be, for example, a rotary electrical machine. This control device includes a detection means for detecting information related to the movement of the vehicle; and a change means that changes the ignition timing of the internal combustion engine according to the detected information when the internal combustion engine starts.

According to the first aspect of the invention, when the internal combustion engine starts, the change means changes the ignition timing of the internal combustion engine according to the information related to the movement of the vehicle which has been detected (for example, the vehicle speed). If, for example, the ignition timing is retarded, the vehicle speed decreases, then, because the ignition timing is retarded when the vehicle is moving at low speed, accordingly an abrupt in torque output is suppressed. After the engine has started, normal control of the ignition timing of the engine may resumes. Due to this, it is possible to reduce the shock that is imparted to the vehicle when the internal combustion engine is being started. Furthermore, if the angle of the ignition timing is advanced when the vehicle is moving at high speed, then it is possible to enhance the output of the internal combustion engine while enhancing the acceleration responsiveness. Accordingly, it is possible to provide a control device for a vehicle that reduces shock when the internal combustion engine starts.

In the control device for a vehicle according to a second aspect of the invention, in addition to the structure of the first aspect of the invention, the detection means includes a vehicle speed sensor. Moreover, a means for retarding the ignition timing, included in the change means, increases the amount by which the ignition timing is retarded the lower the vehicle speed that is detected by the vehicle speed sensor.

According to the second aspect, the lower the detected vehicle speed is, the more the change means retards the ignition timing. Thus, because the ignition timing is retarded when the vehicle is moving at low speed, abrupt increases in torque output are suppressed. As a result, it is possible to reduce the shock that is imparted to the vehicle when the internal combustion engine starts. Moreover, because the angle of the ignition timing is advanced, it is possible to enhance the output of the internal combustion engine while enhancing its acceleration responsiveness.

In the control device for a vehicle according to a third aspect of the invention, in addition to the structure of the first or the second aspect, there is further included a demand detection means for detecting the level of output demanded by the driver. Moreover, the change means includes a means for comparing a first required power that is demanded for the vehicle, based upon the detected level of demand and the detected information, with a second required power, which is demanded from the internal combustion engine based upon the detected information, and for changing the ignition timing based upon the result of that comparison.

According to the third aspect of the invention, the change means compares a first required power, which is demanded for the vehicle based upon the detected level of demand (for example, the accelerator operation amount) and the detected information (for example, the speed of the vehicle), with a second required power, which is demanded from the internal combustion engine based upon the detected information, and changes the ignition timing based upon the result of that comparison. For example, the ignition timing is retarded when the first required power is smaller than the second required power, then the internal combustion engine is controlled so that the ignition timing is retarded when the vehicle is moving at a low speed where the first required power becomes smaller than the second required power. Due to this, abrupt increases in the torque output are suppressed. For this reason, it is possible to reduce the shock that is imparted to the vehicle when the internal combustion engine is being started. Moreover, when the vehicle is moving at a high speed, where the first required power becomes greater than the second required power, the internal combustion engine is controlled so that the ignition timing is advanced when the vehicle is moving at a low speed. Due to this, it is possible to enhance the output of the internal combustion engine while ensuring the desired acceleration responsiveness for the driver.

In the control device for a vehicle according to the fourth aspect of the invention, in addition to the structure of the third aspect, the demand detection means includes a means for detecting accelerator operation amount. Moreover, the change means includes a means that retards the ignition timing when the first required power is less than or equal to the second required power and the detected accelerator operation amount is than or equal to a threshold value that is established in accordance with the detected information.

According to the fourth aspect, the change means retards the ignition timing when the first required power is less than or equal to the second required power and the detected accelerator operation amount is than or equal to a threshold value that is established in accordance with the detected information (for example, the speed of the vehicle). By doing this, when the vehicle is moving at a low speed, where the first required power is less than or equal to the second required power, the internal combustion engine is controlled so that its ignition timing is retarded. Due to this, abrupt increases in torque output are suppressed. Because of this, it is possible to reduce the shock imparted to the vehicle during starting of the internal combustion engine. Furthermore, when the vehicle is moving at a high speed where the first required power becomes greater than the second required power, the internal combustion engine is controlled so that the ignition timing is advanced. Due to this, it is possible to enhance the output of the internal combustion engine while ensuring the desired acceleration responsiveness for the driver.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE INVENTION

In the following, embodiments of the present invention will be described with reference to the figures. In the following description, the same reference symbols are appended to the same or similar components. Their names and functions are also the same. Accordingly, details relating to them will not be repeated.

Figure 1:
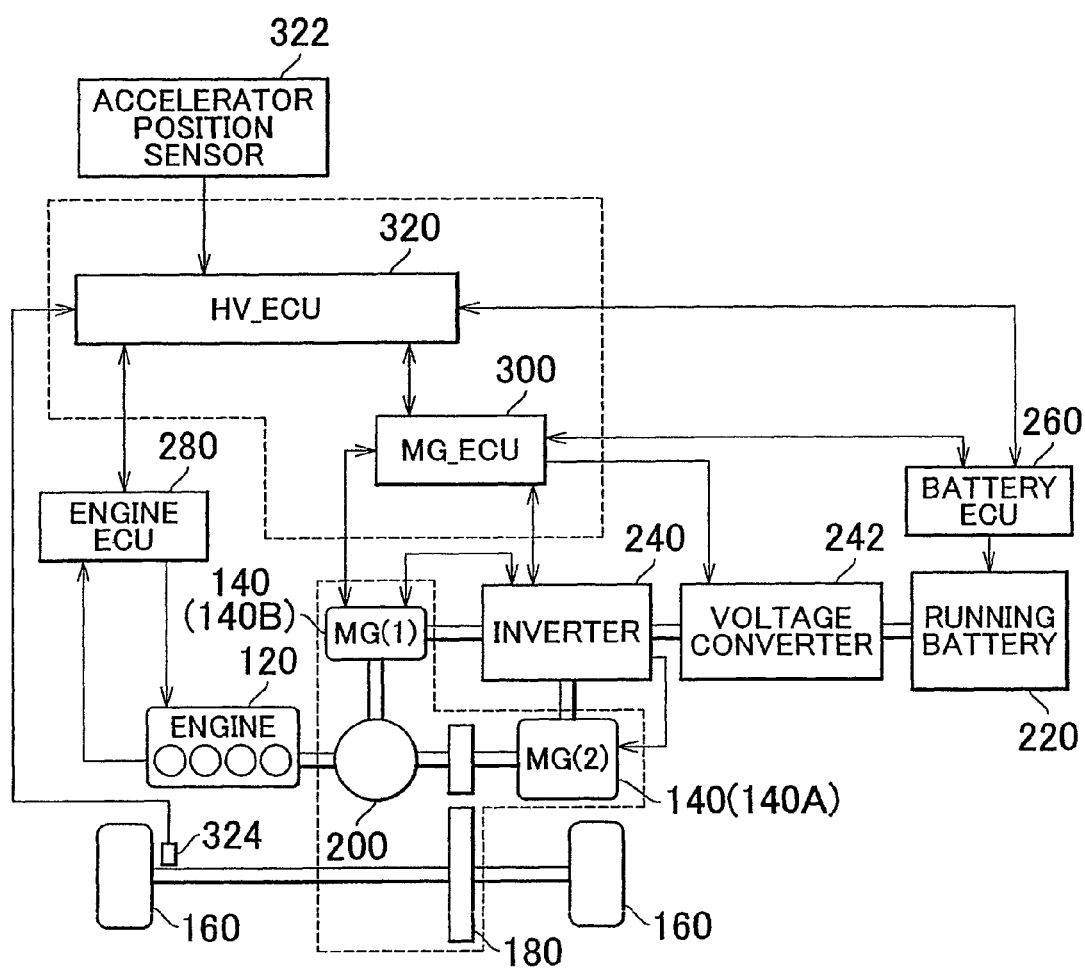
FIG. 1 is a figure showing the structure of a vehicle, to which the control device for a vehicle according to the first embodiment is mounted.

Referring to FIG. 1, a control block diagram of a hybrid vehicle according to an embodiment of the present invention will be explained. It should be understood that the present invention is not limited to the hybrid vehicle shown in FIG. 1; it may be applied to any hybrid vehicle and which is equipped with a secondary battery. Furthermore, an electricity accumulation mechanism that is not a secondary battery, but may be a capacitor or the like, would also be acceptable. Moreover, in the case that it is a secondary battery, it may be a nickel hydrogen battery or a lithium ion battery or the like; the type of battery should not be construed to limit the invention.

The hybrid vehicle includes an internal combustion engine 120 (in the following explanation, explained as an "engine") such as, for example, a gasoline engine or the like, and a motor-generator (MG) 140. It should be understood that while, in FIG. 1, for convenience of explanation, the motor-generator 140 is shown as being a motor 140A and a generator 140B (or a motor-generator 140B), according to the movement of the hybrid vehicle, the motor 140A may function as a generator, and the generator 140B may function as a motor. Regenerative braking is performed when the motor-generator functions as a generator. When the motor-generator functions as a generator, the kinetic energy of the vehicle is converted into electrical energy, and the vehicle is decelerated.

In addition to the above, the hybrid vehicle includes: a speed reduction device 180, which transmits the power generated by the engine 120 or by the motor-generator 140, to drive wheels 160, or transmits the driving force of the drive wheels 160 to the motor-generator 140; a power division mechanism (for example, a planetary gear mechanism) 200, which divides the power generated by the engine 120 into two paths, one to the drive wheels 160 and the other to the generator 140B; a running battery 220, which stores electrical power for driving the motor-generator 140; an inverter 240, which performs electrical current control while converting the DC of the running battery 220 to the AC of the motor 140A and the generator 140B; a battery control unit 260 (hereinafter termed the "battery ECU" (Electronic Control Unit)) which performs management control of the charge state of the running battery 220; an engine ECU 280 which controls the operational state of the engine 120; an MG_ECU 300 which controls the motor-generator 140 and the battery ECU 260 and the inverter 240 and so on according to the state of this hybrid vehicle; a HV_ECU 320 which controls the battery ECU 260, the engine ECU 280, the MG_ECU 300 and so on, and controls the hybrid system as a whole so that it is possible to drive the hybrid vehicle with the greatest efficiency; and the like. The control device for a vehicle according to this embodiment is implemented by the HV-ECU 320.

In this embodiment, a voltage converter is provided between the running battery 220 and the inverter 240. Since the rated voltage of the running battery 220 is lower than the rated voltage of the motor 140A and the motor-generator 140B, the voltage converter 242 is provided to boost the voltage of the electrical power supplied from the running battery 220 to the motor 140A or the motor-generator 140B.

It should be understood that although, in FIG. 1, each ECU is shown as having a separate structure, it would also be acceptable to arrange for two or more of the ECUs to be combined as one ECU (for example, as shown by the dotted line in FIG. 1, to make one ECU by combining the MG-ECU 300 and the HV_ECU 320 is one example of this).

In the power division mechanism 200, a planetary gear mechanism (planetary gear) is used for distributing the power of the engine 120 both to the drive wheels 160 and to the motor-generator 140B. By controlling the rotational speed of the motor-generator 140B, the power division mechanism also functions as a stepless continuously variable transmission. The rotational force of the engine 120 is input to a planetary carrier (C), and then is transmitted by a sun gear (S) to the motor-generator 140B, and by a ring gear (R) to the motor generator 140A and an output shaft (the drive wheels 160 side). When, during regenerative braking, the kinetic energy of the rotation of the engine 120 is converted into electric energy by the motor-generator 140B, and thereby decreasing the rotational speed of the engine 120.

Furthermore, a variable valve timing mechanism (not shown in the figure) may be provided to change the opening and closing timing of its intake valves. This variable valve timing mechanism is a mechanism that changes the phase angle of an intake camshaft (not shown in the figure) by the oil pressure of the working oil of the engine 120. It should be understood that it would also be acceptable to arrange to provide this variable valve timing mechanism to an exhaust camshaft. The variable valve timing mechanism changes the phase angle of the camshaft by oil pressure, based upon a control signal, which is output by the engine ECU 280. When the engine ECU 280 receives an ON signal consisting of a VVT angle advance demand flag from the HV_ECU 320, the engine ECU 280 controls the variable valve timing mechanism to advance the phase angle of the cam shaft changes, and furthermore controls the engine 120 so that the ignition timing is also advanced. Moreover, when the engine ECU 280 receives the ON signal consisting of the VVT angle advance demand flag (or upon receipt of an OFF signal) from the HV_ECU 320, the engine ECU 280 controls the variable valve timing mechanism to retard the phase angle of the camshaft changes, and furthermore controls the engine 120 so that the ignition timing is retarded. It should be understood that the amount by which the ignition timing is advanced or retarded is a parameter that may be empirically determined, and it is not particularly limited.

With a hybrid vehicle to which a hybrid system such as the one shown in FIG. 1 is mounted, if it is determined when the hybrid vehicle is starting off from rest or low speed running or the like that the efficiency of the engine 120 will be poor, the motor 140A of the motor-generator 140 is used as the power source to move the vehicle; while, during normal running, for example, the power of the engine 120 is divided into two paths by the power division mechanism 200, one of which directly drives the drive wheels 160, while the other generates electricity by driving the generator 140B. During normal running, the motor 140A is driven by the electrical power that is generated, and performs auxiliary driving of the drive wheels 160. Furthermore, when the vehicle is moving at high speed, electrical power from the running battery 220 is further supplied to the motor 140A, and the output of the motor 140A is thereby increased, thus performing addition of drive force for the drive wheels 160. On the other hand, during deceleration, the motor 140A, which is driven by the drive wheels 160, functions as a generator and performs regenerative generation of electricity, and the recovered electrical power is stored in the battery for running 220. It should be understood that, if the amount of charge in the battery for running 220 drops, and if it particularly requires to be charged, the output of the engine 120 is increased and the amount of electricity generated by the generator 140B increases, so that the amount of charge in the battery for running 220 is increased. Of course, even during low speed running, if necessary, control may be performed so as to increase the drive amount of the engine 120. For example, sometimes it is necessary to charge the battery for running 220 as described above, and sometimes an auxiliary apparatus, such as an air conditioner or the like, needs to be driven, and sometimes the temperature of the cooling water of the engine 120 needs to be raised to a predetermined temperature, and the like.

An accelerator position sensor 322 detects the amount by which the driver actuates an accelerator pedal; in other words, it detects the accelerator operation amount. This accelerator position sensor 322 transmits its detection signal, which represents the accelerator operation amount, to the HV_ECU 320.

A vehicle speed sensor 324 detects the rotational speed of the drive wheels 160. This vehicle speed sensor 324 transmits its detection signal, which corresponds to the rotational speed of the drive wheels 160, to the HV_ECU 320. And the HV_ECU 320 calculates the speed of the vehicle, based upon the rotational speed of the drive wheels 160 which it has thus received.

Furthermore, a crank angle sensor (not shown in the figures) is provided in the engine 120, and detects the rotational speed of the engine 120. The crank angle sensor transmits its detection signal, which represents the rotational speed of the engine 120, to the HV_ECU 320.

With a hybrid vehicle having a structure like the one above, sometimes the internal combustion engine is started while the vehicle is running to enhance the acceleration responsiveness according to a demand from the driver. Under such circumstances, the ignition timing of the internal combustion engine is advanced and an attempt is made to start the engine, so that the torque output increases rapidly after the engine is started. The rapid torque fluctuation is transmitted along the power transmission path, and there is a possibility that the shock will be imparted to the vehicle. Due to this, there is the problem that the drivability may be deteriorated.

Thus, the present embodiment of the invention is distinguished by the feature that the HV_ECU 320 detects information relating to the running state of the vehicle, and, when the internal combustion engine is being started, the ignition timing of the internal combustion engine is varied according to the detected information.

In concrete terms, the lower the rotational speed of the drive wheels 160 that is detected by the vehicle speed sensor 324, the more the HV_ECU 320 will retard the ignition timing of the engine 120. In this embodiment, by detecting the accelerator operation amount with the accelerator position sensor 322, the HV_ECU 320 detects the level of output demanded by the driver. The HV_ECU 320 then compares the required power (1) which is demanded by the vehicle based upon the accelerator operation amount, which has been detected, and the vehicle speed, and the required power (2) which is demanded from the engine 120 based upon the vehicle speed, and changes the ignition timing according to the result of this comparison. The HV_ECU 320 transmits a control signal that controls the engine 120 to advance or retard the ignition timing to the engine ECU 280. In this embodiment, the HV_ECU 320 advances the ignition timing by transmitting an ON signal to the engine ECU 280 as a VVT angle advance demand flag, and retards the ignition timing by stopping the transmission of this ON signal.

In the following, the control structure of a program that is executed by the HV_ECU 320, which is the control device for a vehicle according to this embodiment, will be explained with reference to FIG. 2.

In a step 100 (in the following, each step will be described as "S"), the HV_ECU 320 determines whether the engine 120 is running under load. For example, while the engine 120 is running, the HV_ECU 320 may determine that the engine 120 is running under load, if the accelerator operation amount as detected by the accelerator position sensor 322 is larger than zero. If the engine 120 is running under load (YES in the step S100), then the process proceeds to a step S104. If not (NO in the step S100), then the process proceeds to a step S102.

In the step S102, the HV_ECU 320 determines whether the engine is undergoing the starting process. For example, the HV_ECU 320 may determine that the engine 120 is undergoing the starting process if, after the starting condition for the engine 120 has held, the rotational speed of the engine is less than or equal to a rotational speed which is determined in advance. If the engine 120 is undergoing the starting process (YES in the step S102), then the process proceeds to the step S104. If not (NO in the step S102), then the process proceeds to a step S110.

Figure 3:
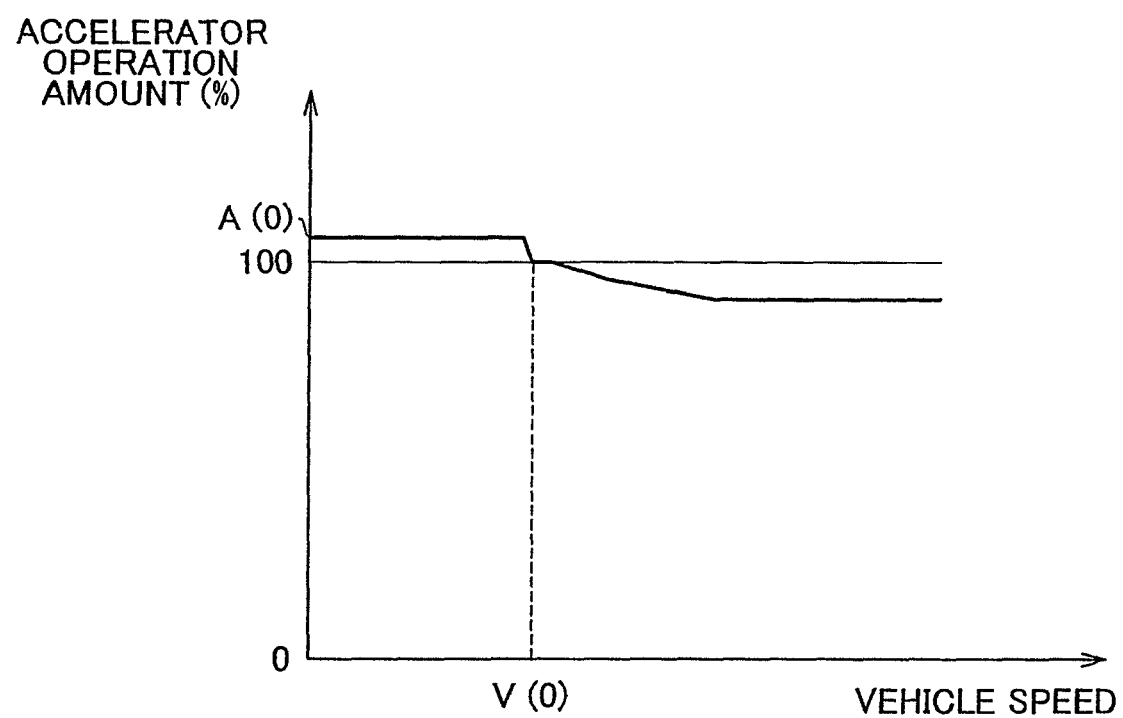
FIG. 3 is a figure showing the threshold value of accelerator operation amount, in correspondence to vehicle speed.

In the step S104, the HV_ECU 320 determines whether the accelerator operation amount that is detected is larger than a map value, which is obtained from the corresponding map shown in FIG. 3. In concrete terms, the map shown in FIG. 3 is stored in the memory of the HV_ECU 320 in advance. And the HV_ECU 320 determines whether the accelerator operation amount, which has been detected by the accelerator position sensor 322 is larger than a map value (the threshold value) calculated from the map shown in FIG. 3 and from the vehicle speed, which is detected by the vehicle speed sensor 324.

In the map shown in FIG. 3, the accelerator operation amount is shown along the vertical axis, and the vehicle speed is shown along the horizontal axis. The solid line shown in FIG. 3 is the map value of the accelerator operation amount corresponding to the speed of the vehicle. As shown in FIG. 3, between a vehicle speed of zero and a vehicle speed V(0) which is determined in advance, the map value is set to a large value A(0), which is larger than 100%. However, the setting of A(0) to a value larger than 100% is not to be considered as being particularly limitative. Accordingly, from a vehicle speed of zero to this vehicle speed V(0), which is determined in advance, the accelerator operation amount never becomes greater than the map value. Furthermore, when the speed is greater than V(0), the map value for the accelerator operation amount, which corresponds to the vehicle speed, is set to a value which is lower than accelerator operation amount 100%. It should be understood that the vehicle speed V(0) and the map values for the accelerator operation amount, which correspond to vehicle speeds larger than V(0), are fitted by experiment or the like.

If the accelerator operation amount that is detected by the acceleration position sensor 322 is larger than the map value, which corresponds to the vehicle speed detected by the vehicle speed sensor 324 (YES in the step S104), then the control process proceeds to the step S108. If not (NO in the step S104), then the process proceeds to the step S106.

Returning to FIG. 2, in the step S106, the HV_ECU 320 decides whether a first required power demanded by the driver is larger than a second required power demanded from the engine, based upon the running state.

Figure 4:
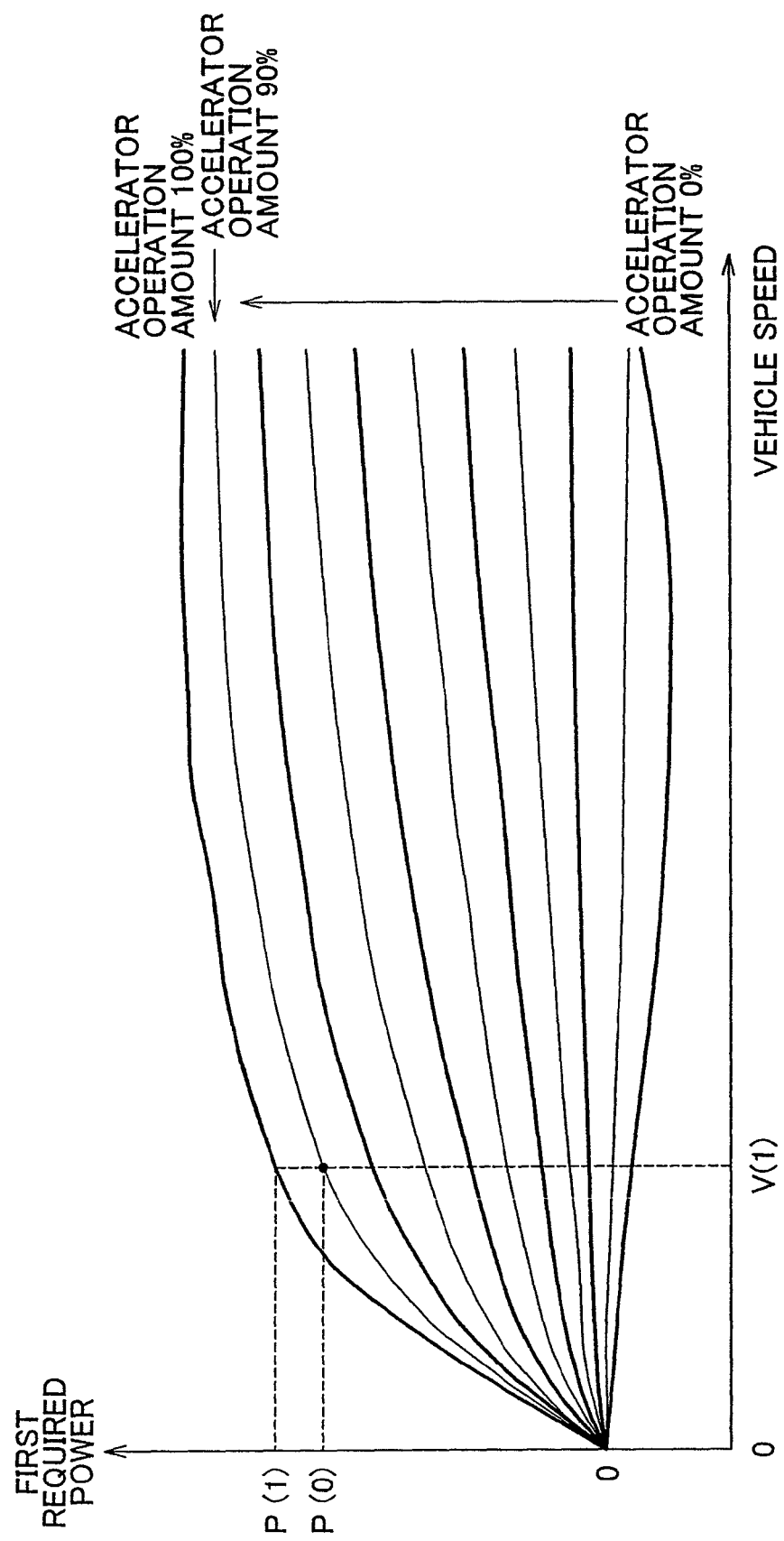
FIG. 4 is a figure showing the relationship between the vehicle speed for various accelerator operation amounts, and a required power (1)

In concrete terms, the first required power is calculated based on the detected vehicle speed and the accelerator operation amount and from a map such as the one shown in FIG. 4, showing the relationship between the accelerator operation amount, the vehicle speed, and the first required power. The map shown in FIG. 4 is one in which the first required power is shown along the vertical axis, the vehicle speed is shown along the horizontal axis, and the relationship between the vehicle speed and the first required power is shown for each 10% of vehicle speed for accelerator operation amounts of 0% to 100%. The map shown in FIG. 4 is stored in advance in the memory of the HV_ECU 320. In addition, the map shown in FIG. 4 may be fitted by experiment or the like.

It should be understood that it would be acceptable to arrange for the first required power shown in FIG. 4 to be the power that output to the drive wheels 160, so that it includes the losses due to friction or the like through the power transmission path from the engine 120 to the drive wheels 160. It would also be acceptable to arrange to add the amount of losses due to friction and the like to the map value which has been obtained from the map shown in FIG. 4.

For example, if the detected accelerator operation amount is 90%, and the vehicle speed is V(1), then the first required power, which is demanded by the driver for the vehicle, is calculated as being P(0). It should be understood that, in this embodiment, the first required power, which is calculated in each calculation cycle, is supposed to be subjected to rate processing. "Rate processing" refers to processing in which the amount (rate) of change of the first required power is limited. For example, as shown in FIG. 4, suppose that the vehicle speed is V(1), and the detected accelerator operation amount in the previous calculation cycle is 90%, so that the first required power (1) is P(0). At this time, with the vehicle speed in this calculation cycle being V(1), even if the accelerator operation amount is 100%, then the first required power is not changed stepwise from P(0) to P(1), but rather is calculated so that it approaches from P(0) to P(1) linearly at a rate of change (a rate proportion) that is determined in advance.

Figure 5:
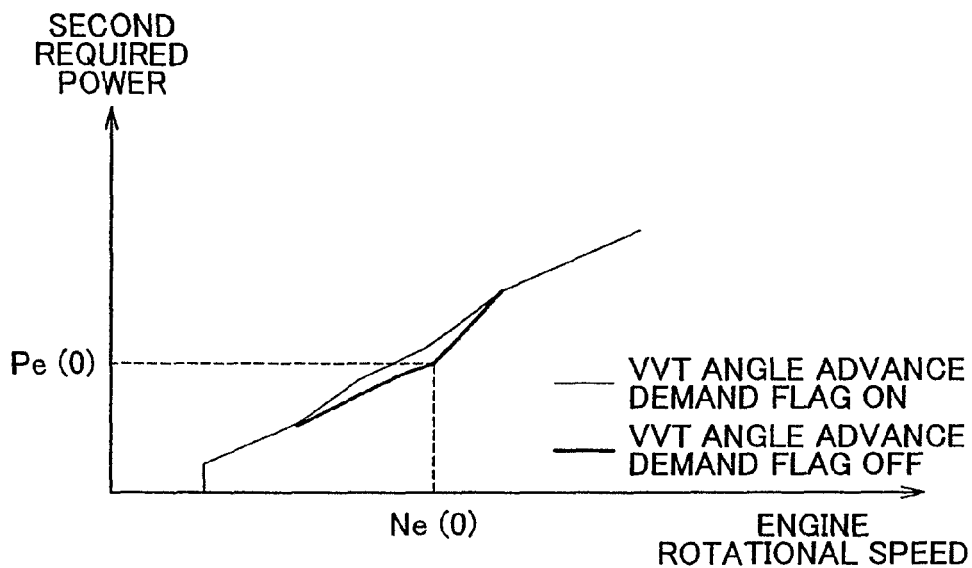
FIG. 5 is a figure showing the relationship between the engine rotational speed, and a required power (2)

On the other hand, the HV_ECU 320 calculates the second required power based on the engine rotational speed, which has been obtained by the crank angle sensor, and from a map like the one shown in FIG. 5 giving the relationship between the engine rotational speed and the second required power.

The map shown in FIG. 5 shows the relationship between the engine rotational speed and the second required power, in which the second required power is shown along the vertical axis and the engine rotational speed is shown along the horizontal axis, and is an output characteristic curve for the engine 120, which is set based upon an operational line that is determined in advance (e.g., an optimum fuel consumption line). The map shown in FIG. 5 is stored in advance in the memory of the HV_ECU 320. It should be understood that this operational line for the engine 120 may be fitted by experiment or the like, to keep the engine 120 in a high torque region while minimizing its fuel consumption.

The solid line shown in FIG. 5 is an output characteristic curve when the VVT angle advance demand flag is ON, in other words when the ignition timing is advanced; and the thick line portion shown in FIG. 5 is an output characteristic curve when the VVT angle advance demand flag is OFF, in other words when the ignition timing is retarded.

For example, when the detected engine rotational speed is Ne(0) and the VVT angle advance demand flag is OFF, then, according to the map shown in FIG. 5, the required power (2) is calculated as being Pe(0).

The HV_ECU 320 calculates the first required power based upon the detected accelerator operation amount and the vehicle speed, and upon the map shown in FIG. 4, and performs rate processing. The HV_ECU 320 calculates the second required power, which is being demanded from the engine 120 from the map shown in FIG. 5, based upon the detected engine rotational speed and the VVT angle advance demand flag. The HV_ECU 320 decides whether the first required power, which has been rate processed, is greater than the second required power, which has been calculated. If the first required power is greater than the second required power (YES in the step S106), then the control process proceeds to the step S108. But if not (NO in the step S106), then the control process proceeds to the step S110.

Referring again to FIG. 2, in the step S108, the HV_ECU 320 turns the VVT angle advance demand flag ON. In other words, the HV_ECU 320 transmits the ON signal of the VVT angle advance demand flag to the engine ECU 280. And, upon receipt of this ON signal of the VVT angle advance demand flag, the engine ECU 280 controls the variable valve timing mechanism to advance the phase angle, and moreover controls the engine 120 so that the ignition timing is also advanced.

In the step S110, the HV_ECU 320 the VVT angle advance demand flag OFF. In other words, the HV_ECU 320 stops transmitting the ON signal of the VVT angle advance demand flag to the engine ECU 280. Or, it would also be acceptable to arrange for the HV_ECU 320 to transmit an OFF signal of the VVT angle advance demand flag to the engine ECU 280. And, when the VVT angle advance demand flag goes to OFF, the engine ECU 280 controls the variable valve timing mechanism to retard the phase angle and moreover controls the engine 120 so that the ignition timing is retarded.

Figure 6:
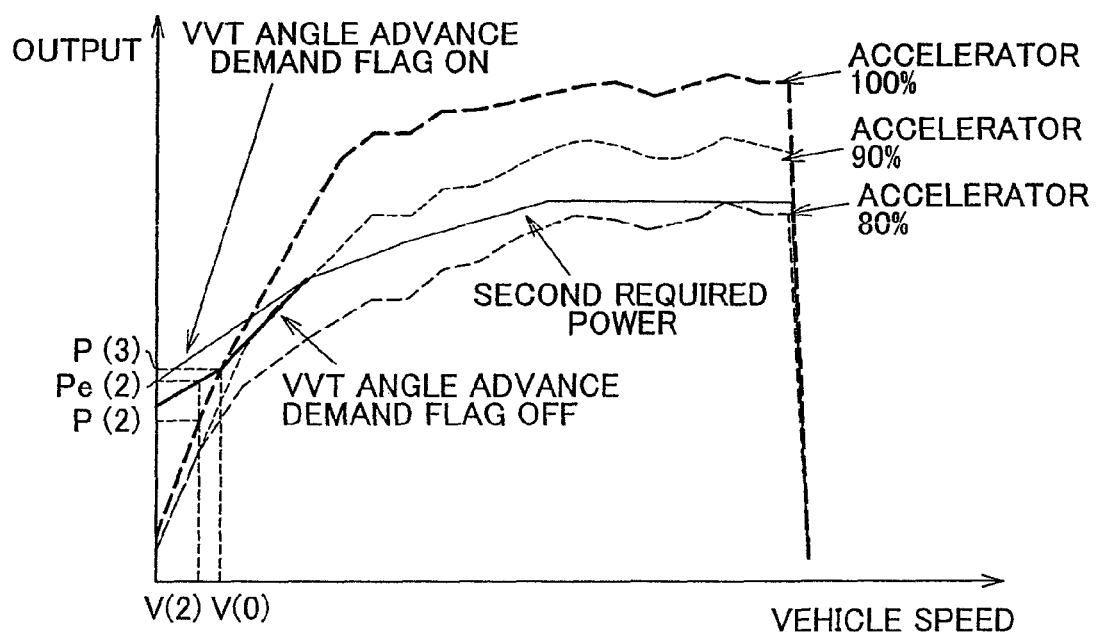
FIG. 6 is a figure showing the relationship between the vehicle speed, and the required power (1) and the required power (2)

The operation of the HV_ECU 320, which is the control device for a vehicle according to this embodiment, will now be explained with reference to FIG. 6 and based upon the structure and the flow chart in the above. In FIG. 6, in which the output is taken along the vertical axis and the vehicle speed is taken along the horizontal axis, there are shown (by the broken lines) the first required power in the map shown in FIG. 4 for each 10% of accelerator operation amount from 80% to 100%, and (by the solid line) the second required power when the horizontal axis of the map shown in FIG. 5 is taken as engine rotational speed instead of vehicle speed.

For example suppose that, when the engine 120 is stopped, the vehicle is accelerated using the power of the electric motor. At this time point, the VVT angle advance demand flag is OFF. When the driver increases the accelerator operation amount and demands more acceleration, the vehicle is accelerated using the power of the motor 140A. And, when the driver further increases the accelerator operation amount, the first required power is rate processed and increases along with the increase of the accelerator operation amount and the increase of the vehicle speed.

When the starting condition for the engine 120 holds, the HV_ECU 320 demands starting of the engine 120 to the engine ECU 280 (NO in the step S100 and YES in the step S102). When the vehicle speed is V(2) which is smaller than V(0), in the map shown in FIG. 3, even if the detected accelerator operation amount is 100%, it is still smaller than the map value (NO in the step S104). Furthermore, as shown in FIG. 6, the required power (1) at the vehicle speed V(2), when the accelerator operation amount is 100%, is P(2), and is smaller than the required power (2) of Pe(2), which is calculated from the engine rotational speed (NO in the step S106). Accordingly, since the VVT angle advance demand flag is turned OFF (S110), the engine 120 is controlled so that the ignition timing is retarded. Thus, because abrupt fluctuations in torque output when the engine is being started are suppressed, the shock imparted to the vehicle is reduced.

If the driver increases the accelerator operation amount (YES in the step S100), along with the first required power increasing, the vehicle speed progressively increases. And, when the vehicle speed becomes greater than V(0), if the detected accelerator operation amount is larger than the map value (YES in the step S104), the first required power, which has been rate processed based on the accelerator operation amount and the vehicle speed, becomes greater than the second required power (YES in the step S106), then the VVT angle advance demand flag is turned ON (in the step S108).

For example, when the detected accelerator operation amount is 100%, the first required power at the vehicle speed V(0) becomes P(3). Furthermore, at the vehicle speed V(0), the second required power also becomes P(3), as shown by the thick line in FIG. 6. And, when the vehicle speed becomes greater than V(0), then the first required power becomes greater than the second required power. At this time, the VVT angle advance demand flag is turned ON.

When the VVT angle advance demand flag is ON, the engine 120 is controlled so that the ignition timing is advanced. At this time, the output of the engine 120 approaches towards the solid line from the single dotted broken line. In other words, since the output of the engine 120 increases, the acceleration responsiveness is enhanced.

Since, by doing as above, according to the control device for a vehicle according to this embodiment, when the vehicle is moving at a low speed where the first required power is less than or equal to the second required power, the engine is controlled so that the ignition timing is retarded, accordingly abrupt increases in the torque output are suppressed. Due to this, it is possible to reduce the shock imparted to the vehicle when starting the engine. Furthermore since, when the vehicle is moving at a high speed where the first required power becomes greater than the second required power, the engine is controlled so that the angle of the ignition timing is advanced, accordingly it is possible to enhance the output of the engine, and thus to assure the acceleration responsiveness which is desired by the driver. Accordingly, it is possible to provide a control device for the vehicle that can reduce the shock imparted during starting of the internal combustion engine.

In the following, a control device for a vehicle according to a second embodiment of the present invention will be explained. To compare the structure of the vehicle to which the vehicle control device according to this embodiment is mounted with that of the vehicle to which the control device for a vehicle according to the first embodiment described above was mounted, the control structure of the program, which is executed by the HV_ECU 320, is different. The other structures are the same as those in the structure of the vehicle to which the control device for a vehicle according to the first embodiment described above was mounted. Therefore, the same reference symbols are appended to them. Their functions are also the same. Accordingly, the detailed explanation thereof will not be repeated herein.

In the following, the control structure of the program that is executed by the HV_ECU 320, which is the control device for a vehicle according to this embodiment, will be explained with reference to FIG. 7.

Figure 2:
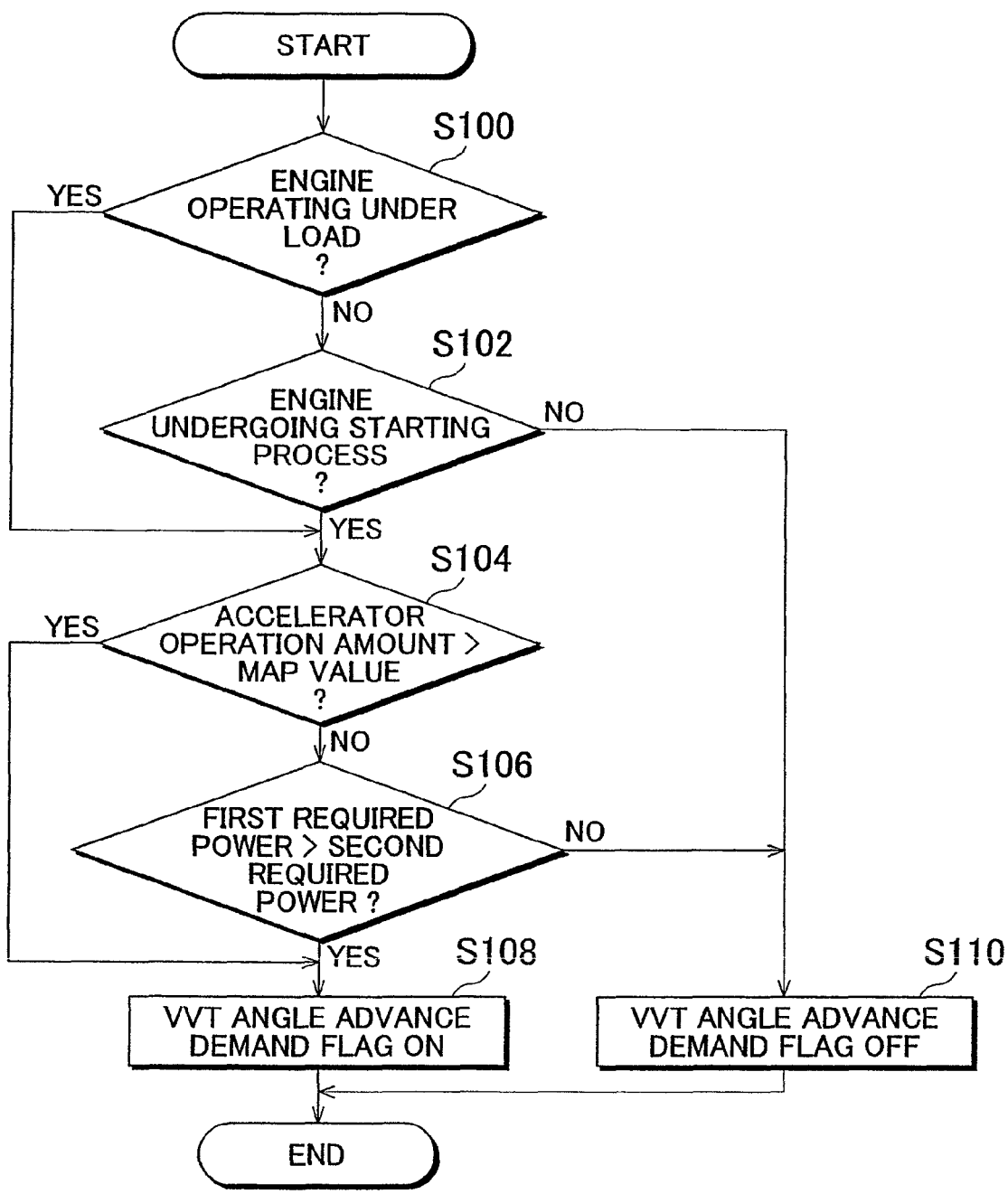
FIG. 2 is a flow chart showing the control structure of a program executed by an HV_ECU, which is the control device for a vehicle according to the first embodiment.
Figure 7:
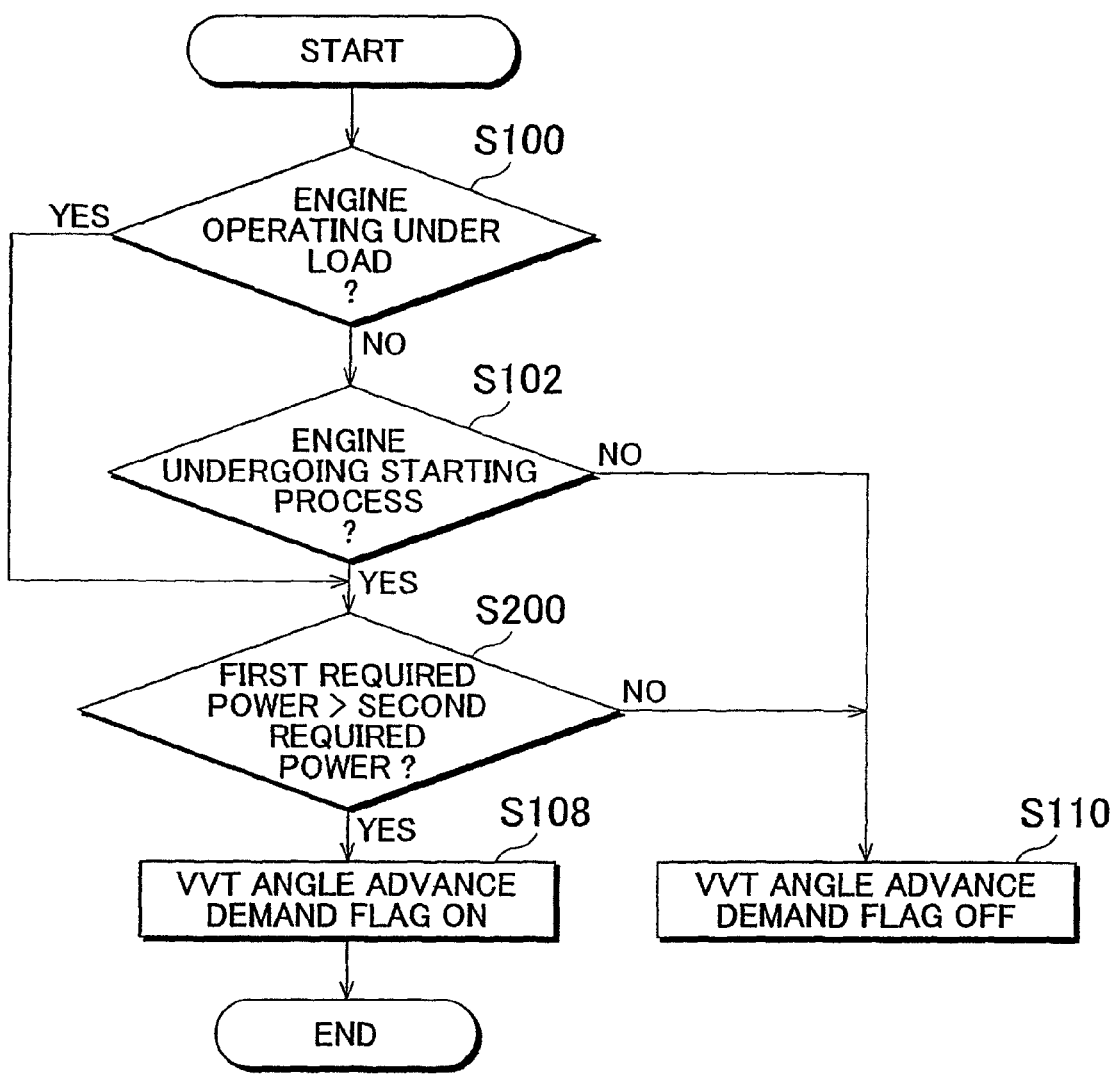
FIG. 7 is a flow chart showing the control structure of a program executed by an HV_ECU, which is a control device for a vehicle according to a second embodiment.

It should be understood that, in the flow chart shown in FIG. 7, the same step numbers are appended to processes that are the same as in the flow chart shown in FIG. 2 and previously described. These processes are also the same. Accordingly, detailed explanation thereof will not be repeated herein.

If the engine 120 is under load (YES in the step S100), or the engine 120 is undergoing starting processing (YES in the step S102), then, in a step S200, the HV_ECU 320 determines whether the first required power that is demanded by the driver from the vehicle is greater than the second required power that is being demanded from the engine. The method of comparison between the first required power and the second required power differs from the method of comparison explained with respect to the step S106 of the flow chart of FIG. 2 in that the first required power before the rate processing is performed is compared with the second required power. In other words, the HV_ECU 320 determines whether the first required power, which is calculated based upon the accelerator operation amount and the vehicle speed, is greater than the second required power for each calculation cycle. If the first required power is greater than the second required power (YES in the step S200), then the flow of control proceeds to the step S108. If not (NO in the step S200), then the flow of control proceeds to the step S110.

The operation of the HV_ECU 320, which is the control device for a vehicle according to this embodiment, will now be explained based upon the structure and the flow chart as above.

For example suppose that the engine 120 is stopped, accordingly the vehicle accelerates using the power of the motor. At this time point, it is supposed that the VVT angle advance demand flag is OFF. When the driver requires acceleration and increases the opening amount of the accelerator, the vehicle accelerates using the power of the motor. When the driver further increases the accelerator operation amount, the first required power also increases progressively according to the accelerator operation amount and the vehicle speed.

When the starting condition for the engine 120 is satisfied, the HV_ECU 320 demands starting of the engine to the engine ECU 280 (No in the step S100, YES in the step S102). If the vehicle speed is lower than V(0), then, as shown in FIG. 6, the first required power is smaller than the second required power (NO in the step S200). Accordingly, since the VVT angle advance demand flag is turned OFF (S110), the engine 120 controls the ignition timing so that the timing is retarded. At this time, because abrupt fluctuations of the torque output of the engine 120 are suppressed, accordingly shock imparted to the vehicle during starting of the engine 120 is reduced.

The vehicle speed progressively increases along with increase of the first required power according to increase of the accelerator operation amount (YES in the step S100). And, when the vehicle speed becomes greater than V(0), when the first required power based upon the accelerator operation amount and the vehicle speed becomes greater than the second required power (YES in the step S200), then the VVT angle advance demand flag is turned ON (in the step S108). The engine 120 is controlled so that its ignition timing is advanced. At this time the acceleration responsiveness is enhanced, because the output of the engine 120 is increased.

As per the above, according to the control device for a vehicle according to this embodiment, the same beneficial effects are obtained as with the first embodiment described above. In other words, it is possible to reduce the shock that is imparted during starting of the internal combustion engine.

In the following, a control device for a vehicle according to a third embodiment of the present invention will be explained. To compare the structure of the vehicle to which the vehicle control device according to this embodiment is mounted with that of the vehicle to which the control device for a vehicle according to the first embodiment described above was mounted, the control structure of the program that is executed by the HV_ECU 320 is different. The other structures are the same as those in the structure of the vehicle to which the control device for a vehicle according to the first embodiment described above was mounted. Therefore, the same reference symbols are appended to them. Their functions are also the same. Accordingly, the detailed explanation thereof will not be repeated herein.

In the following, the control structure of the program that is executed by the HV_ECU 320, which is the control device for a vehicle according to this embodiment, will be explained with reference to FIG. 8.

Figure 8:
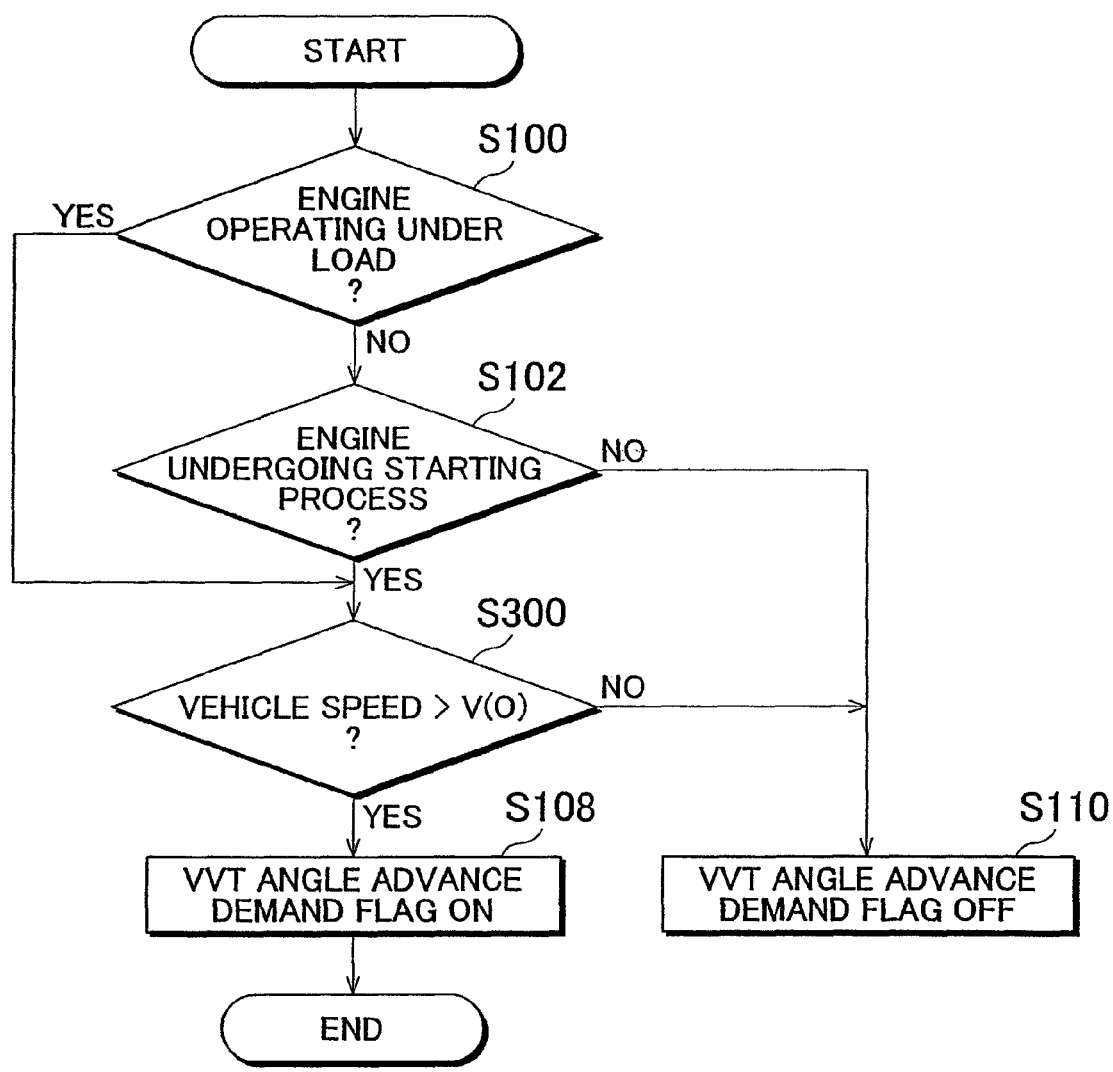
FIG. 8 is a flow chart showing the control structure of a program executed by an HV_ECU, which is a control device for a vehicle according to a third embodiment.

It should be understood that, in the flow chart shown in FIG. 8, the same step numbers are appended to processes, which are the same as in the flow chart shown in FIG. 2 and previously described. These processes are also the same. Accordingly, detailed explanation thereof will not be repeated herein.

If the engine 120 is under load (YES in the step S100), or the engine 120 is undergoing starting processing (YES in the step S102), then, in a step S300, the HV_ECU 320 determines whether the vehicle speed detected by the vehicle speed sensor 324 is greater than a vehicle speed V(0) that has been determined in advance. This vehicle speed V(0) may be the vehicle speed at which, for example, when the accelerator operation amount is 100%, the first required power and the second required power described above are approximately equal to one another; but this is not to be considered as being particularly limitative. If the vehicle speed is greater than V(0) (YES in the step S300), then the flow of control proceeds to the step S108. If not (NO in the step S300), then the flow of control proceeds to the step S110.

The operation of the HV_ECU 320, which is the control device for a vehicle according to this embodiment, will now be explained based upon the structure and the flow chart as above.

For example suppose that, when the engine 120 is stopped, the vehicle accelerates using the power of the motor. At this time point, it is supposed that the VVT angle advance demand flag is OFF. When the driver requires acceleration and increases the opening amount of the accelerator, the vehicle accelerates using the power of the motor. When the driver further increases the accelerator operation amount, the first required power also increases progressively according to the accelerator operation amount and the vehicle speed.

When the starting condition for the engine 120 is satisfied, the HV_ECU 320 demands starting of the engine to the engine ECU 280 (No in the step S100, YES in the step S102). If the vehicle speed is lower than V(0) (NO in the step S300), then, since the VVT angle advance demand flag is turned OFF (S110), the engine 120 controls the ignition timing so that the timing is retarded. At this time, because abrupt fluctuations in the torque output of the engine 120 are suppressed, the shock imparted to the vehicle during starting of the engine 120 is reduced.

The vehicle speed progressively increases along with increase of the first required power according to increase of the accelerator operation amount (YES in the step S100). And, when the vehicle speed becomes greater than V(0) (YES in the step S300), then the VVT angle advance demand flag is turned ON (in the step S108). The engine 120 is controlled so that its ignition timing is advanced. At this time the acceleration responsiveness is enhanced, since the output of the engine 120 is increased.

As per the above, according to the vehicle control device according to this embodiment, the same beneficial effects are obtained as with the first embodiment described above. In other words, it is possible to reduce the shock that is imparted during starting of the internal combustion engine.

It should be understood that while, in these embodiments, the ignition timing is varied based upon the vehicle speed, this parameter is not particularly limited to being the vehicle speed, provided that it is information related to the running state of the vehicle; for example, it would also be acceptable to arrange to vary the ignition timing based upon the rotational speed of the drive wheels 160.

In the embodiments disclosed above, all of the various features may be considered as given by way of example, and not as being limitative. The range of the present invention is not limited by the above explanation, and is given by the range of the Patent Claims; all changes which have the same meaning as the range of the Patent Claims and which are within their scope are intended to be included.

The invention claimed is:

1. A control device for a vehicle which uses, as a source of drive power, an internal combustion engine and a rotary electrical machine, comprising:
a detector that detects a vehicle speed of the vehicle; and
a changing device that, during starting of the internal combustion engine, changes the ignition timing of the internal combustion engine according to the detected vehicle speed;
wherein, the changing device retards the ignition timing; when the detected vehicle speed is less than or equal to a predetermined speed,
wherein a reference ignition timing is set at the predetermined speed, and
wherein, as the detected vehicle speed becomes gradually lower from the predetermined speed, the more the changing device retards the ignition timing from the reference ignition timing accordingly.

2. A control device for a vehicle according to claim 1, wherein the changing device advances the ignition timing from the reference ignition timing, when the detected vehicle speed is greater than the predetermined speed.

3. A control device according to claim 1, wherein
after the internal combustion engine has started, normal control of the ignition timing of the internal combustion engine is resumed.

4. A method for controlling a vehicle powered by at least one of an internal combustion engine and a rotary electrical machine, comprising:
detecting a vehicle speed of the vehicle; and
changing the ignition timing of the internal combustion engine according to the detected vehicle speed when the internal combustion engine is being started, and
retarding the ignition timing, when the detected vehicle speed is less than or equal to a predetermined speed, wherein a reference ignition timing is set at the predetermined speed, wherein
the amount, by which the ignition timing is retarded from the reference ignition timing, is increased accordingly as the detected vehicle speed becomes gradually lower from the predetermined speed.

5. The method according to claim 4, further comprising:
advancing the ignition timing from the reference ignition timing, when the detected vehicle speed is greater than the predetermined speed.

6. The method according to claim 4, further comprising:
resuming normal control of the ignition timing of the internal combustion engine after the internal combustion engine has started.

7. A control device for a vehicle which uses, as a source of drive power, an internal combustion engine and a rotary electrical machine, comprising:
a detector that detects a vehicle speed of the vehicle;
a changing device that, during starting of the internal combustion engine, changes the ignition timing of the internal combustion engine according to the detected vehicle speed; and
a demand detector that detects the level of output demanded by the driver, wherein;
the changing device compares a first required power which is demanded for the vehicle based upon the detected level of demand and the detected vehicle speed, with a second required power which is demanded from the internal combustion engine based upon the detected vehicle speed, and changes the ignition timing based upon the result of that comparison.

8. A control device for a vehicle according to claim 7, wherein the demand detector
detects accelerator opening amount, and the changing device retards the ignition timing, when the first required power is less than or equal to the second required power, and the detected accelerator opening amount becomes less than or equal to a threshold value corresponding to the detected vehicle speed.

9. A control device according to claim 7, wherein
after the internal combustion engine has started, normal control of the ignition timing of the internal combustion engine is resumed.

10. A method for controlling a vehicle powered by at least one of an internal combustion engine and a rotary electrical machine, comprising:
detecting a vehicle speed of the vehicle ; and
changing the ignition timing of the internal combustion engine according to the detected vehicle speed when the internal combustion engine is being started;
detecting the level of output demanded by the driver,
determining a first required power, which is demanded for the vehicle, based upon the detected level of demand and the detected vehicle speed;
determining a second required power, which is demanded from the internal combustion engine based upon the detected vehicle speed; and
comparing the first required power with the second required power,
wherein the ignition timing is changed based upon the result of that comparison.

11. The method according to claim 10, wherein:
the level of output-demanded by the driver is determined based on an accelerator operation amount, and
the ignition timing is retarded when the first required power is less than or equal to the second required power, and the accelerator operation amount is less than or equal to a threshold value corresponding to the detected vehicle speed.

12. The method according to claim 10, further comprising:
resuming normal control of the ignition timing of the internal combustion engine after the internal combustion engine has started.

* * * * *